(12) United States Patent
Aoyagi

(10) Patent No.: US 8,988,484 B2
(45) Date of Patent: Mar. 24, 2015

(54) VIDEO PROCESSING APPARATUS AND CONTROL METHOD THEREOF

(71) Applicant: Mitsutoshi Aoyagi, Kawagoe (JP)

(72) Inventor: Mitsutoshi Aoyagi, Kawagoe (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 139 days.

(21) Appl. No.: 13/731,926

(22) Filed: Dec. 31, 2012

(65) Prior Publication Data

US 2014/0002583 A1 Jan. 2, 2014

(30) Foreign Application Priority Data

Jun. 29, 2012 (JP) ................................. 2012-147762

(51) Int. Cl.
 H04N 7/15 (2006.01)
 H04N 7/14 (2006.01)
 H04L 29/06 (2006.01)
 H04L 12/18 (2006.01)

(52) U.S. Cl.
 CPC ................. *H04N 7/15* (2013.01); *H04N 7/147* (2013.01); *H04L 65/4084* (2013.01); *H04L 12/1818* (2013.01)
 USPC ................... 348/14.08; 348/14.09; 348/14.12

(58) Field of Classification Search
 CPC ........... H04N 7/15; H04N 7/152; H04N 7/14; H04N 7/142; H04N 7/144; H04N 7/147; H04N 7/148; H04L 12/1813; H04L 65/403; H04L 65/4064
 USPC .............................. 348/14.01–14.16; 709/204
 See application file for complete search history.

(56) References Cited

U.S. PATENT DOCUMENTS

| | | | |
|---|---|---|---|
| 6,583,806 B2 * | 6/2003 | Ludwig et al. | 348/14.08 |
| 8,264,520 B2 | 9/2012 | Oya | |
| 2008/0088698 A1 * | 4/2008 | Patel et al. | 348/14.09 |
| 2009/0268009 A1 | 10/2009 | Oya | |
| 2012/0206561 A1 * | 8/2012 | Huang | 348/14.09 |

FOREIGN PATENT DOCUMENTS

| | | |
|---|---|---|
| JP | 2002-044285 | 2/2002 |
| JP | 2004-094447 | 3/2004 |
| JP | 2005-267146 | 9/2005 |
| JP | 2009-267968 | 11/2009 |
| JP | 2010-034694 | 2/2010 |
| JP | 2010-245956 | 10/2010 |
| JP | 2012-054646 | 3/2012 |

OTHER PUBLICATIONS

Japanese Patent Application No. 2012-147762, First Office Action, mailed May 7, 2013, (with English Translation).

* cited by examiner

*Primary Examiner* — Melur Ramakrishnaiah

(74) *Attorney, Agent, or Firm* — Blakely, Sokoloff, Taylor & Zafman LLP

(57) ABSTRACT

According to one embodiment, a video processing apparatus includes an input module configured to be able to perform input operation in order to register, to a server, information including a video of a face of a first person and information including a video of a face of a second person with whom the videoconferencing is conducted, in such a manner that the information including the video of the face of the first person and the information including the video of the face of the second person with whom the videoconferencing is conducted are registered in tandem.

5 Claims, 11 Drawing Sheets

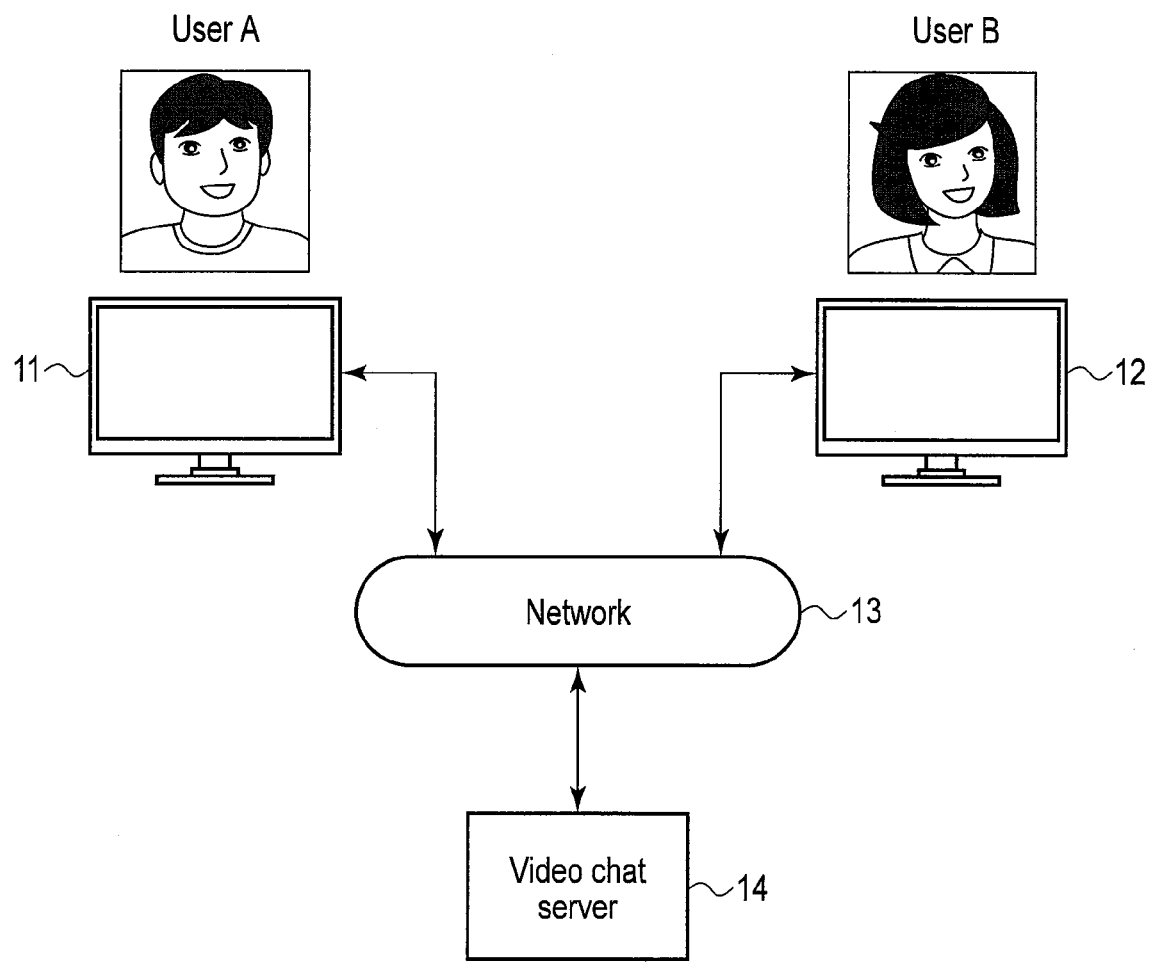
F I G. 1

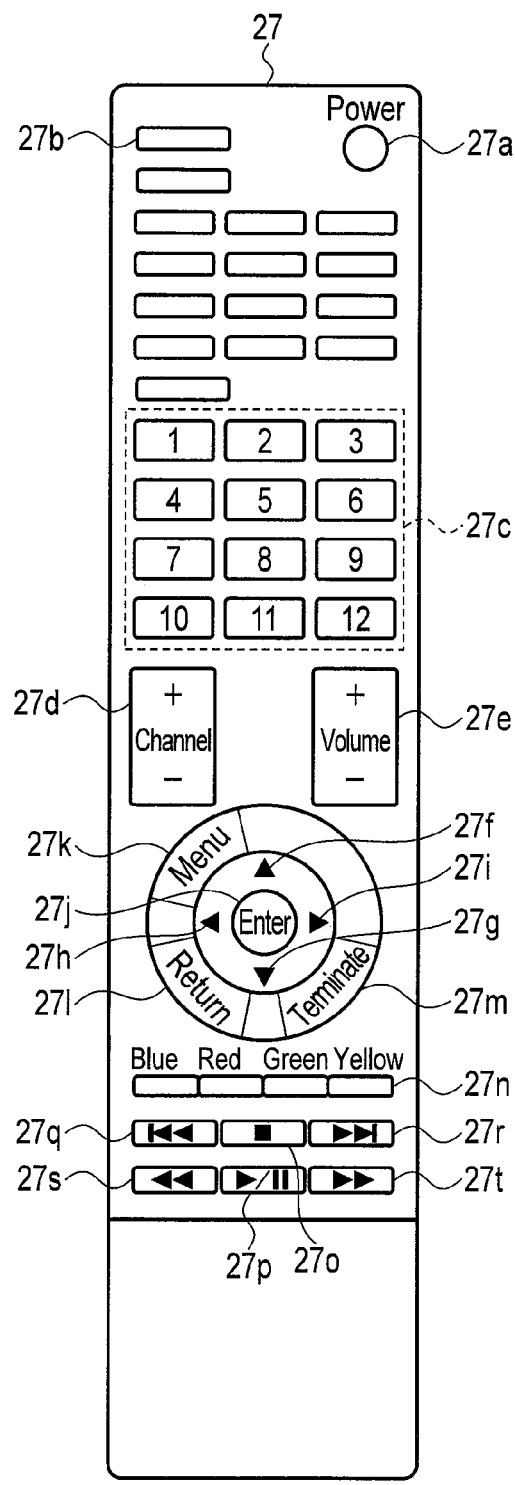
F I G. 3

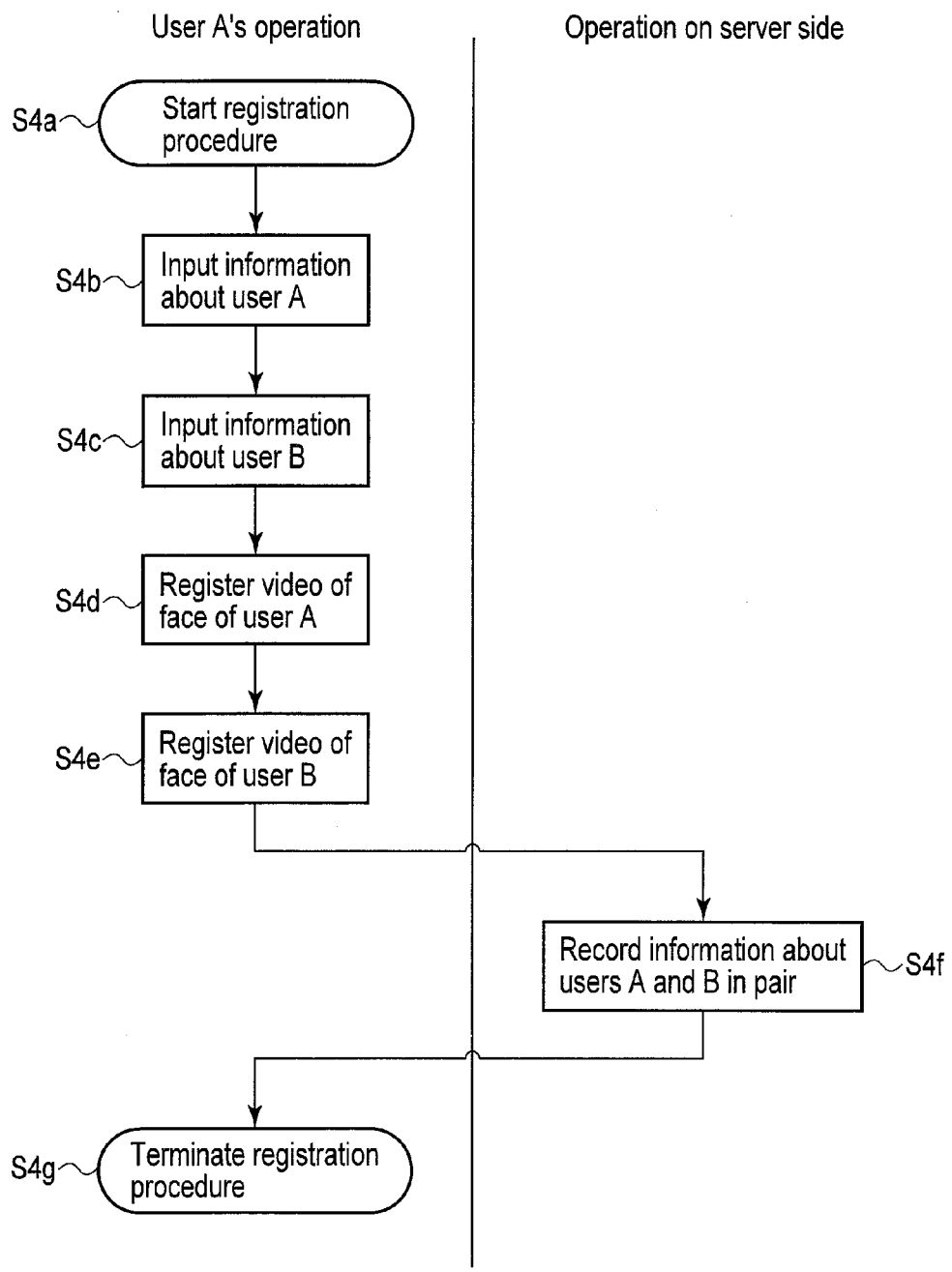
F I G. 4

User information input — 33

| | | |
|---|---|---|
| Primary registrant name | User A |  |
| Primary registered device ID | User A | |
| Dependent registrant name | User B |  |
| Dependent registrant name | User A | |

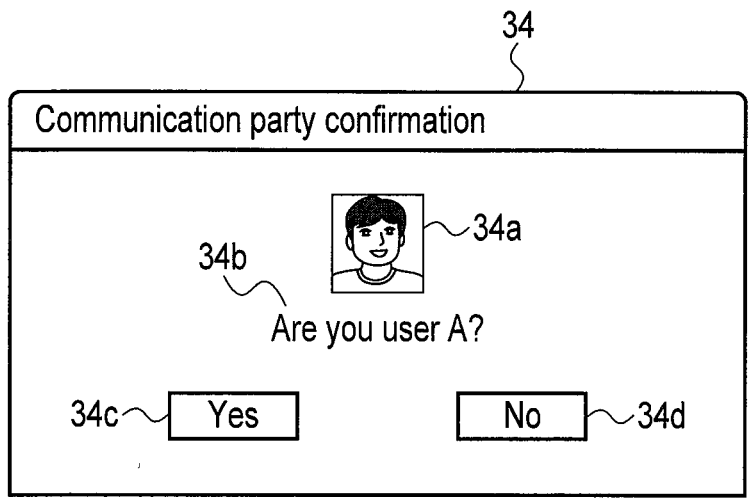
F I G. 7
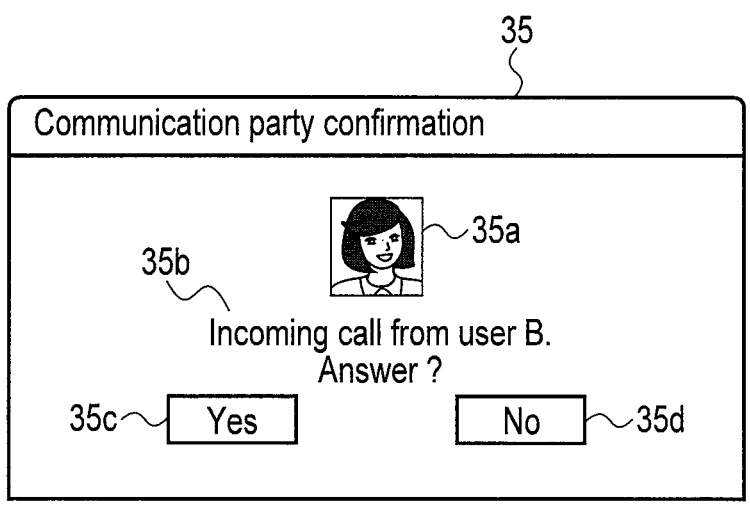
F I G. 8

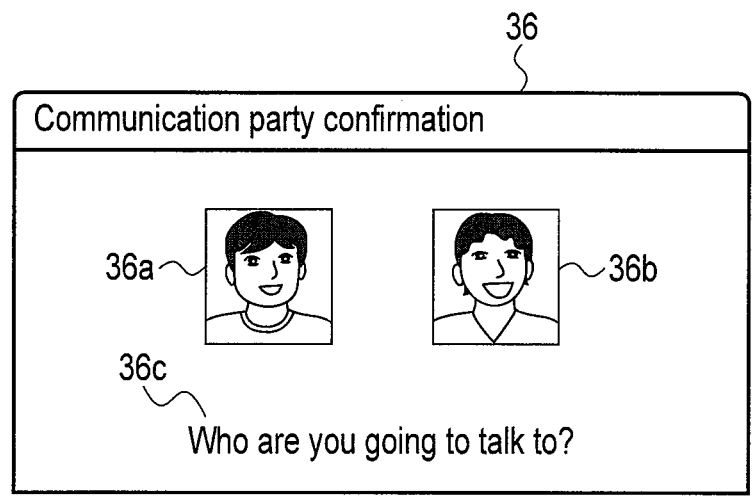
F I G. 12

VIDEO PROCESSING APPARATUS AND CONTROL METHOD THEREOF

CROSS-REFERENCE TO RELATED APPLICATIONS

This application is based upon and claims the benefit of priority from Japanese Patent Application No. 2012-147762, filed Jun. 29, 2012, the entire contents of which are incorporated herein by reference.

FIELD

Embodiments described herein relate generally to a video processing apparatus of a digital television broadcast reception apparatus and the like and a control method thereof.

BACKGROUND

As is well known, currently, for example, multiple video processing apparatuses of digital television broadcast reception apparatuses and the like are connected to a network such as the Internet, and a so-called video chat service has been put into practical use, which enables videoconferencing using the network between these video processing apparatuses.

It should be noted that, in order to use this video chat service, a user who uses the service needs to register unique information such as a password, a user identification (ID), and a device ID to a video chat server in advance by means of the user's video processing apparatus, and complete initial setting of the video chat server.

However, such operation for registering the unique information is extremely cumbersome for a user who is unfamiliar with the device operation such as elderly people, and this makes barrier that prevents the video chat service from widely spreading. Accordingly, how registration of unique information, i.e., initial setting to a video chat server, is currently a problem.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block configuration diagram for schematically illustrating and explaining an example of a video chat system which is an embodiment;

FIG. 3 is an external view for illustrating and explaining an example of a remote controller used in the digital television broadcast reception apparatus according to the embodiment;

FIG. 4 is a flowchart for illustrating and explaining an example of registration operation performed by one of users with the digital television broadcast reception apparatus according to the embodiment;

FIG. 7 is a figure for illustrating and explaining an example of a communication party confirmation screen which is video-displayed by the digital television broadcast reception apparatus according to the embodiment;

FIG. 8 is a figure for illustrating and explaining another example of a communication party confirmation screen which is video-displayed by the digital television broadcast reception apparatus according to the embodiment;

FIG. 12 is a figure for illustrating and explaining still another example of a communication party confirmation screen which is video-displayed by the digital television broadcast reception apparatus according to the embodiment.

DETAILED DESCRIPTION

Figure 2:
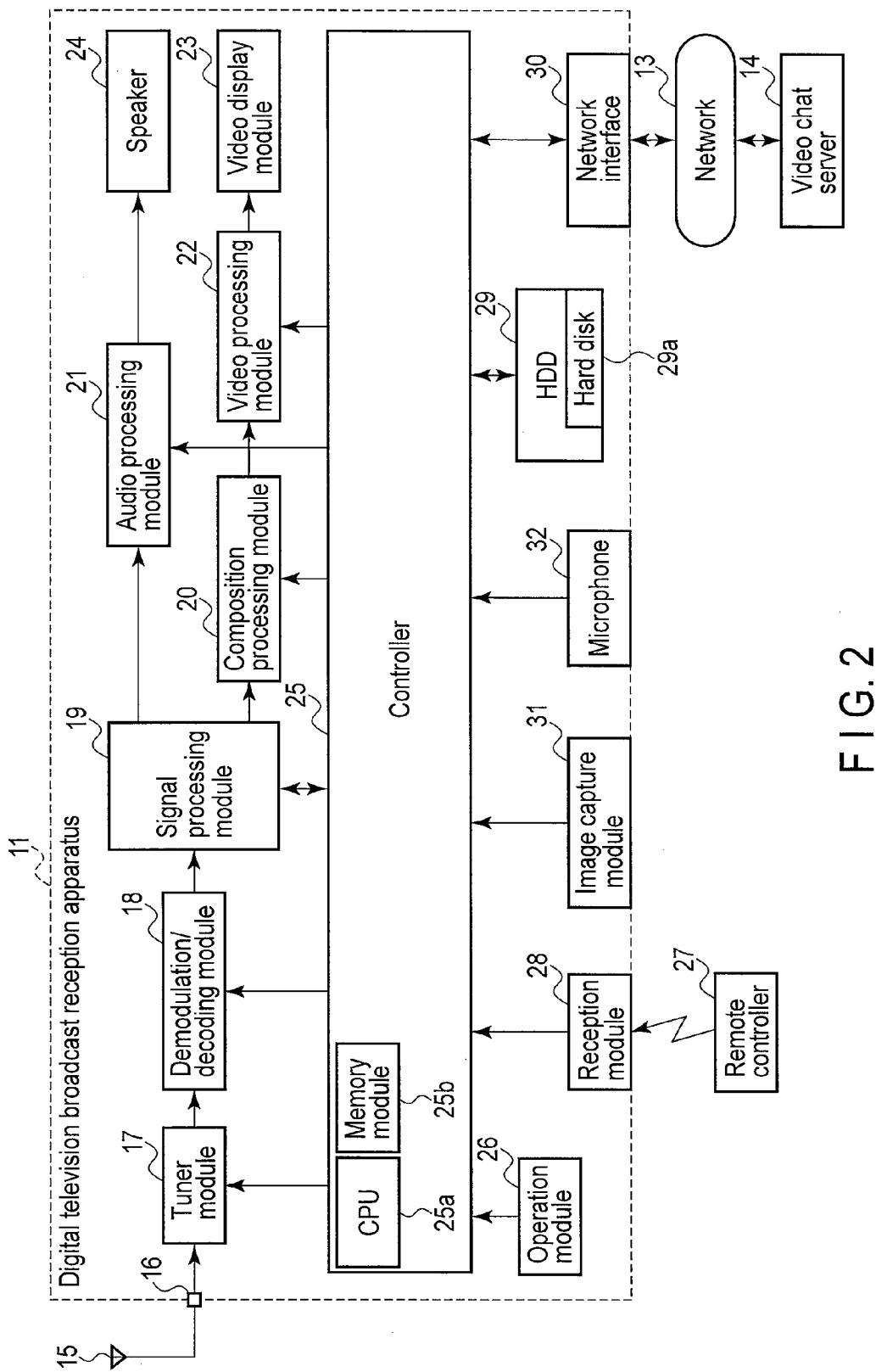
FIG. 2 is a block configuration diagram for schematically illustrating and explaining an example of a signal processing system of a digital television broadcast reception apparatus constituting the video chat system according to the embodiment.

Various embodiments will be described hereinafter with reference to the accompanying drawings.

In general, according to one embodiment, a video processing apparatus relates to a video processing apparatus for conducting videoconferencing via a network with a device of a second person, using a videoconferencing service provided by a server. The video processing apparatus comprises an input module configured to be able to perform input operation in order to register, to the server, information including a video of a face of a first person and information including a video of a face of a second person with whom the videoconferencing is conducted, in such a manner that the information including the video of the face of the first person and the information including the video of the face of the second person with whom the videoconferencing is conducted are registered in tandem.

FIG. 1 schematically illustrates an example of a video chat system explained in this embodiment. More specifically, in this video chat system, a digital television broadcast reception apparatus 11 possessed by a user A and a digital television broadcast reception apparatus 12 possessed by a user B are connected via a network 13.

Each of these digital television broadcast reception apparatuses 11 and 12 has not only an original function for receiving digital television broadcast signal and displaying video thereof and playing voice thereof, but also a function for capturing an image of faces of users A and B themselves and collecting their voices, transmitting signals of the face videos, the voices, and the like via the network 13, receiving the signals of the face videos, the voices, and the like via the network 13, and displays the video thereof and plays the voices thereof.

Each of these digital television broadcast reception apparatuses 11 and 12 is registered to a video chat server 14 connected to the same network 13, and uses video chat service provided by the video chat server 14, so that the digital television broadcast reception apparatuses 11 and 12 can conduct videoconferencing therebetween.

FIG. 2 schematically illustrates an example of a signal processing system of the digital television broadcast reception apparatus 11 possessed by user A. It should be noted that a signal processing system of the digital television broadcast reception apparatus 12 possessed by user B is configured the same as the digital television broadcast reception apparatus 11, and description thereabout is omitted.

In other words, a digital television broadcast signal received at an antenna 15 is supplied to a tuner 17 via an input terminal 16 so that a desired channel broadcast signal is selected. The broadcast signal selected in the tuner 17 is supplied to a demodulator/decoder 18 and recovered to a digital video signal and a digital speech signal, which are output to a signal processing module 19.

The signal processing module 19 performs predetermined digital signal processing on the digital video signal and the digital speech signal supplied from the demodulator/decoder 18, respectively. Then, the signal processing module 19 outputs the digital video signal to a composition processing module 20, and outputs the digital audio signal to an audio processing module 21.

Among them, the composition processing module 20 superimposes an on-screen display (OSD) signal onto the digital video signal provided from the signal processing module 19, and outputs the OSD signal. The digital video signal which is output from this composition processing module 20 is provided to the video processing module 22, and is converted into an analog video signal in a format that can be displayed by the video display module 23 in a later stage, and is thereafter provided to the video display module 23 for video display.

On the other hand, the audio processing module 21 converts the received digital audio signal into an analog audio signal in a format for reproduction with the speaker 24 in a later stage. Then, the analog audio signal output from the audio processing module 21 is provided to the speaker 24, and is reproduced as a sound.

In this case, in the digital television broadcast reception apparatus 11, the controller 25 centrally controls all operations including various kinds of reception operations as described above. This controller 25 includes a central processing unit (CPU) 25a, and receives operation information from an operation module 26 provided on the main body of the digital television broadcast reception apparatus 11 or operation information transmitted from the remote controller 27 and received by the reception module 28, thus controlling each module so as to reflect the contents of operation thereof.

In this case, the controller 25 uses a memory module 25b. The memory module 25b mainly includes a read-only memory (ROM) for storing a control program executed by the CPU 25a, a random access memory (RAM) for providing a work area to the CPU 25a, and a nonvolatile memory for storing various kinds of setting information, control information, and the like.

This controller 25 is connected to a hard disk drive (HDD) 29. This controller 25 provides the digital video signal and the digital audio signal obtained from the signal processing module 19 to the HDD 29, based on user A's operation with the operation module 26 and the remote controller 27, and can perform control so as to record them on the hard disk 29a.

In addition, based on operation of the operation module 26 and the remote controller 27 by user A, the controller 25 controls the HDD 29 so that the digital video signal and the digital audio signal are read from the hard disk 29a, and are provided to the signal processing module 19, so that the signals are displayed as a video and reproduced as a sound as described above.

This controller 25 is connected to a network interface 30. This network interface 30 is connected to the network 13 explained above. This network 13 is connected to the video chat server 14 for providing video chat service using the communication function via the network 13.

For this reason, the controller 25 accesses the video chat server 14 via the network interface 30 and the network 13 based on user A's operation with the operation module 26 and the remote controller 27, and can use the video chat service provided thereby.

This controller 25 is connected to an image-capturing module 31. This controller 25 causes the image-capturing module 31 to capture an image based on user A's operation with the operation module 26 and the remote controller 27, and can perform control so as to display the obtained video signal with the video display module 23 as a video and to cause the HDD 29 to record it on the hard disk 29a.

In addition, the controller 25 performs control so as to cause the image-capturing module 31 to capture an image based on the use of the video chat service and transmit the obtained video signal to the network 13 via the network interface 30, and to cause the video display module 23 to display, as a video, the video signal received from the network 13 by the network interface 30.

This controller 25 is connected to a microphone 32. This controller 25 can perform control so as to cause the microphone 32 to collect voice based on user A's operation with the operation module 26 and the remote controller 27 and play, as sound, the obtained audio signal using the speaker 24, and cause the HDD 29 to record it on the hard disk 29a.

Further, this controller 25 can perform control so as to cause the microphone 32 to collect voice based on the use of the video chat service and transmit the obtained audio signal via the network interface 30 to the network 13, and play, as sound, the obtained audio signal received from the network 13 by the network interface 30, using the speaker 24.

FIG. 3 illustrates an example of an external appearance of the remote controller 27. This remote controller 27 is mainly provided with a power key 27a, a video chat activation key 27b, a numerals/hiragana key 27c, a channel up/down key 27d, a volume adjustment key 27e, a cursor-up key 27f, a cursor-down key 27g, a cursor-left key 27h, a cursor-right key 27i, an enter key 27j, a menu key 27k, a return key 27l, a terminate key 27m, four-color (blue, red, green, yellow) color keys 27n, and the like.

This remote controller 27 is provided with a play stop key 27o, a play/temporary stop key 27p, a backward skip key 27q, a forward skip key 27r, a fast rewind key 27s, a fast forward key 27t, and the like. More specifically, the HDD 29 can be played, stopped, and temporarily stopped by operating the play stop key 27o and the play/temporary stop key 27p of the remote controller 27.

So-called backward skip and forward skip, which is to skip data of video, audio, and the like read from the hard disk 29a by the HDD 29 in the backward or forward direction with respect to the playback direction by a certain amount, can be performed by operating the backward skip key 27q and the forward skip key 27r of the remote controller 27.

Further, so-called fast rewind play and fast forward play, which is to continuously play data of video, audio, and the like read from the hard disk 29a by the HDD 29 in the backward or forward direction with respect to the playback direction, can be performed by operating the fast rewind key 27s and the fast forward key 27t of the remote controller 27.

Figure 5:
FIG. 5 is a figure for illustrating and explaining an example of user information input screen which is video-displayed by the digital television broadcast reception apparatus according to the embodiment.
Figure 5:

FIG. 4 illustrates a flowchart summarizing an example of operation procedure when user A performs registration with respect to the video chat server 14. This registration operation is started when user A operates the video chat activation key 27b of the remote controller 27 to access the video chat server 14, and a user information input screen 33 an example of which is shown in FIG. 5 is obtained and displayed with the video display module 23 as video (step S4a).

Then, in step S4b, user A operates the numerals/hiragana key 27c of the remote controller 27 to input the name of his own to each of a field of a primary registrant name and one of fields of two dependent registrant names of the user information input screen 33. The controller 25 of the digital television broadcast reception apparatus 11 automatically inputs the device ID of its own into a field of a primary registration device ID of the user information input screen 33.

Thereafter, in step S4c, user A operates the numerals/hiragana key 27c of the remote controller 27 to input the name of user B into the other of the fields of the two dependent registrant names of the user information input screen 33.

Subsequently, in step S4d, user A causes the image-capturing module 31 to capture an image of user A's face, so that the video of user A's face is input into the field corresponding to the primary registrant of the user information input screen 33. Thereafter, in step S4e, user A causes the image-capturing module 31 to capture an image of user B's face, so that the video of user B's face is input into the field corresponding to the dependent registrant of the user information input screen 33.

In this manner, when required information is input into each field of the user information input screen 33, the video chat server 14 records information about user A and information about user B which are input via the user information input screen 33 in tandem in step S4f; and on this occasion, the registration operation performed by user A with respect to the video chat server 14 is terminated (step S4g).

Figure 6:
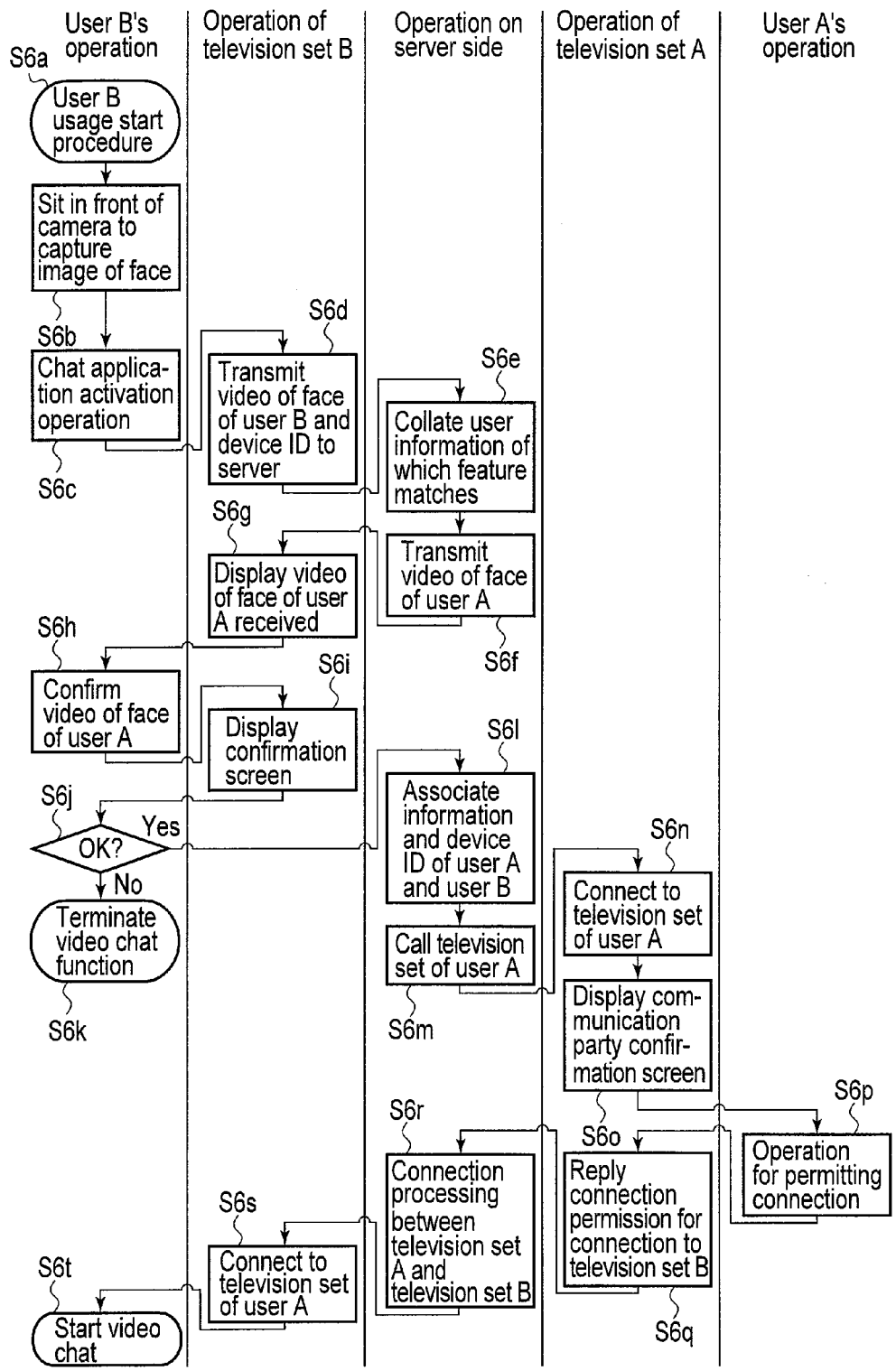
FIG. 6 is a flowchart for illustrating and explaining an example of registration operation performed by the other of the users with the digital television broadcast reception apparatus according to the embodiment.

FIG. 6 illustrates a flowchart summarizing an example of operation procedure when user B performs registration with respect to the video chat server 14. The registration performed by user B with respect to the video chat server 14 is started (step S6a) when the registration of user A and user B in tandem with respect to the video chat server 14 explained above has been finished.

More specifically, in step S6b, user B sits at a position where an image of the face of user B is captured by the image-capturing module of the digital television broadcast reception apparatus 12 possessed by user B, and in step S6c, user B operates the video chat activation key of the remote controller associated with the digital television broadcast reception apparatus 12 to access the video chat server 14.

Accordingly, the digital television broadcast reception apparatus 12 transmits the device ID of himself/herself and the video of user B's face to the video chat server 14 in step S6d. Then, in step S6e, the video chat server 14 extracts a video of a face of which feature matches the received video of user B's face from among many pieces of user information registered, and in step S6f, the video chat server 14 replies the video of user A's face, which is registered in tandem with the video of the face extracted, to the digital television broadcast reception apparatus 12.

For this reason, in step S6g, the digital television broadcast reception apparatus 12 displays the video of user A's face received from the video chat server 14 on the video display module 23 as video. Accordingly, in step S6h, user B can confirm the video of user A's face on the screen of the video display module 23.

Then, in step S6i, the digital television broadcast reception apparatus 12 displays the communication party confirmation screen 34, an example of which is shown in FIG. 7, on the video display module 23 as video. This communication party confirmation screen 34 displays the video of user A's face 34a, an inquiry message 34b "Are you user A?" a selection item 34c "Yes", and a selection item 34d "No".

On this communication party confirmation screen 34, user B determines whether the displayed video of the face 34a is user A or not in step S6j. For example, when the video of the face 34a displayed on the communication party confirmation screen 34 is a video of a face of a person similar to user A, user B operates the cursor-left or cursor-right key of the remote controller associated with the digital television broadcast reception apparatus 12 to select a selection item 34d "No" and operate the enter key. Accordingly, the video chat function is terminated (step S6k).

When the video of the face 34a displayed on the communication party confirmation screen 34 is determined to be user A in step S6j, user B operates the cursor-left or cursor-right key of the remote controller associated with the digital television broadcast reception apparatus 12, and user B selects the selection item 34c "Yes" and operates the enter key.

Then, in step S6l, the video chat server 14 records the information about user A which has already been input (the primary registrant name, the device ID of the digital television broadcast reception apparatus 11, the video of user A's face, and the like) and the information about user B (the dependent registrant name, the device ID of the digital television broadcast reception apparatus 12, the video of user B's face, and the like) which are associated with each other, and on this occasion, the registration of user B with respect to the video chat server 14 is performed.

More specifically, user B sits at a position where an image of the face is captured by the image-capturing module of the digital television broadcast reception apparatus 12 possessed by user B, and operates the video chat activation key of the remote controller to select a selection item 34c "Yes" on the communication party confirmation screen 34 displayed on the video display module 23, and operates the enter key, which is extremely simple operation. User B can perform registration with respect to the video chat server 14 by doing such extremely simple operation. More specifically, user B can complete the initial setting of the video chat server 14 without performing a complicated registration operation. Therefore, this can improve the convenience and practicability for user B.

In this manner, when the registration of user B with respect to the video chat server 14 is completed, the video chat server 14 thereafter calls the digital television broadcast reception apparatus 11 of user A in step S6m, and connects to the digital television broadcast reception apparatus 11 in such a manner as to be able to communicate therewith in step S6n.

Then, in step S6o, the digital television broadcast reception apparatus 11 of user A displays the communication party confirmation screen 35, an example of which is shown in FIG. 8, on the video display module 23 as video. This communication party confirmation screen 35 displays the video of user B's face 35a, an inquiry message 35b "Incoming call from user B. Answer?" a selection item 35c "Yes", and a selection item 35d "No".

When user A permits connection on this communication party confirmation screen 35 in step S6p, user A operates the cursor-left key 27h or cursor-right key 27i of the remote controller 27 to select a selection item 35c "Yes" and operate the enter key 27j. Then, in step S6q, the digital television broadcast reception apparatus 11 replies, to the video chat server 14, connection permission for connection to the digital television broadcast reception apparatus 12 of user B.

Accordingly, in step S6r, the video chat server 14 connects the digital television broadcast reception apparatus 11 of user A and the digital television broadcast reception apparatus 12 of user B so as to allow communication therebetween. In step S6s, the digital television broadcast reception apparatus 12 of user B is controlled to be able to communicate with the digital television broadcast reception apparatus 11 of user A. Accordingly, user B can start video chat with user A (step S6t).

Figure 9:
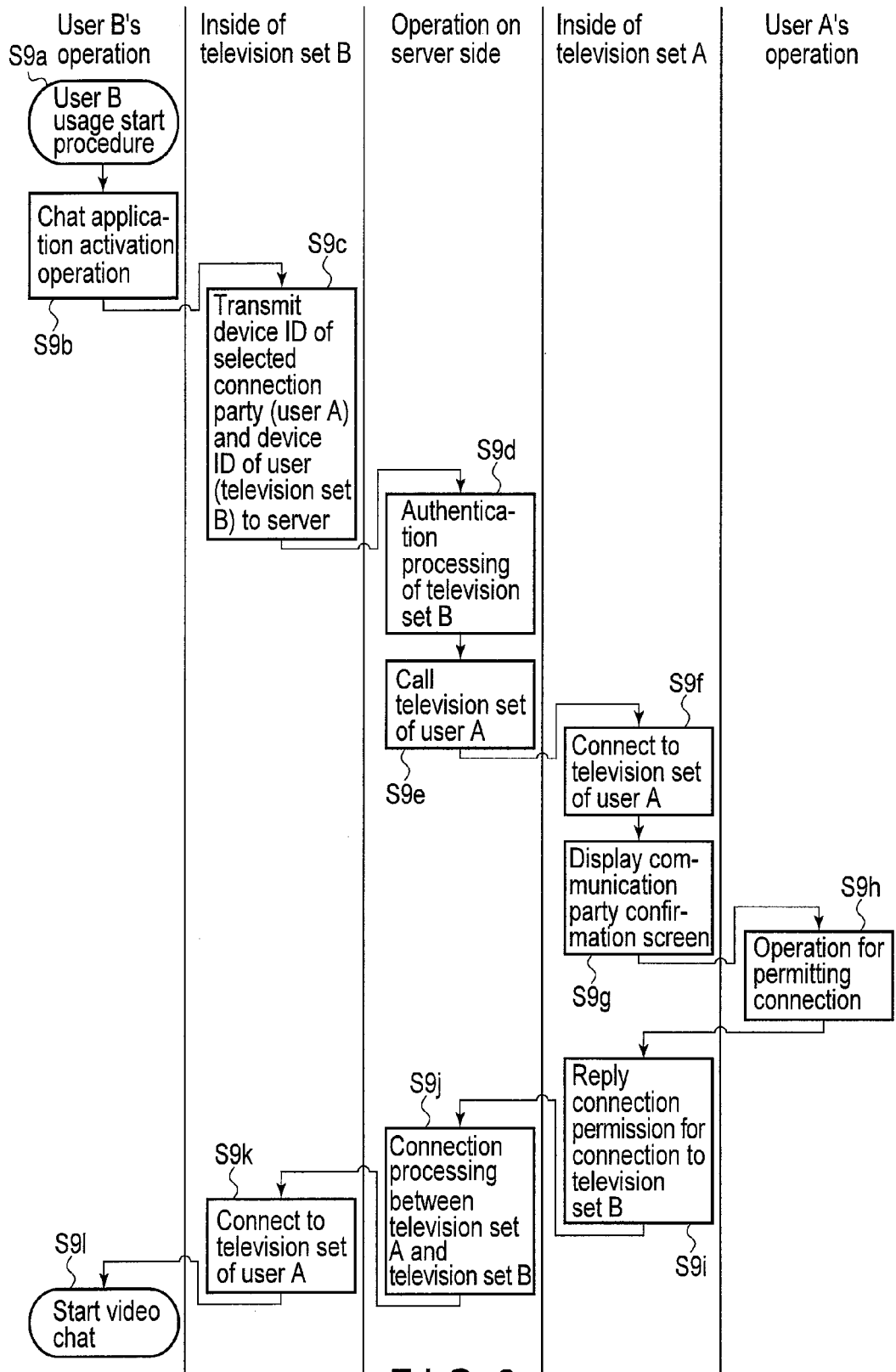
FIG. 9 is a flowchart for illustrating and explaining an example of video chat start operation performed by one of the users with the digital television broadcast reception apparatus according to the embodiment.

FIG. 9 illustrates a flowchart summarizing an example of procedure according to which user B conducts video chat with user A, when the registration of user B with regard to user A is completed as described above. More specifically, when started (step S9a), in step S9b, user B operates the video chat activation key of the remote controller associated with the digital television broadcast reception apparatus 12 possessed by user B to access the video chat server 14.

Then, in step S9c, the digital television broadcast reception apparatus 12 transmits, to the video chat server 14, the device ID of the communicating party selected in the past, i.e., the device ID of the digital television broadcast reception apparatus 11 possessed by user A, and the device ID of the digital television broadcast reception apparatus 12. Accordingly, in step S9d, the video chat server 14 executes authentication processing of the digital television broadcast reception apparatus 12 of user B.

Thereafter, in step S9e, the video chat server 14 calls the digital television broadcast reception apparatus 11 of user A, and in step S9f, connects to the digital television broadcast reception apparatus 11 in such a manner as to be able to communicate therewith. Then, in step S9g, the digital television broadcast reception apparatus 11 of user A displays the communication party confirmation screen 35, an example of which is shown in FIG. 8, on the video display module 23 as video.

When user A permits connection on this communication party confirmation screen 35 in step S9h, user A operates the cursor-left key 27h or cursor-right key 27i of the remote controller 27 to select the selection item 35c "Yes" and operate the enter key 27j. Then, in step S9i, the digital television broadcast reception apparatus 11 replies, to the video chat server 14, connection permission for connection to the digital television broadcast reception apparatus 12 of user B.

Accordingly, in step S9j, the video chat server 14 connects the digital television broadcast reception apparatus 11 of user A and the digital television broadcast reception apparatus 12 of user B so as to allow communication therebetween. In step S9k, the digital television broadcast reception apparatus 12 of user B is controlled to be able to communicate with the digital television broadcast reception apparatus 11 of user A. Accordingly, user B can start video chat with user A (step S9l).

According to the above embodiment, user A registers the information about user A and the information about user B in tandem to the video chat server 14 in advance, so that user B can complete the registration with respect to the video chat server 14 just by performing simple operation of confirming user A and activation operation of the video chat. Accordingly, user B can complete the initial setting to the video chat server 14 without doing any complicated registration operation, and therefore, this can improve the convenience and practicability for user B.

Figure 10:
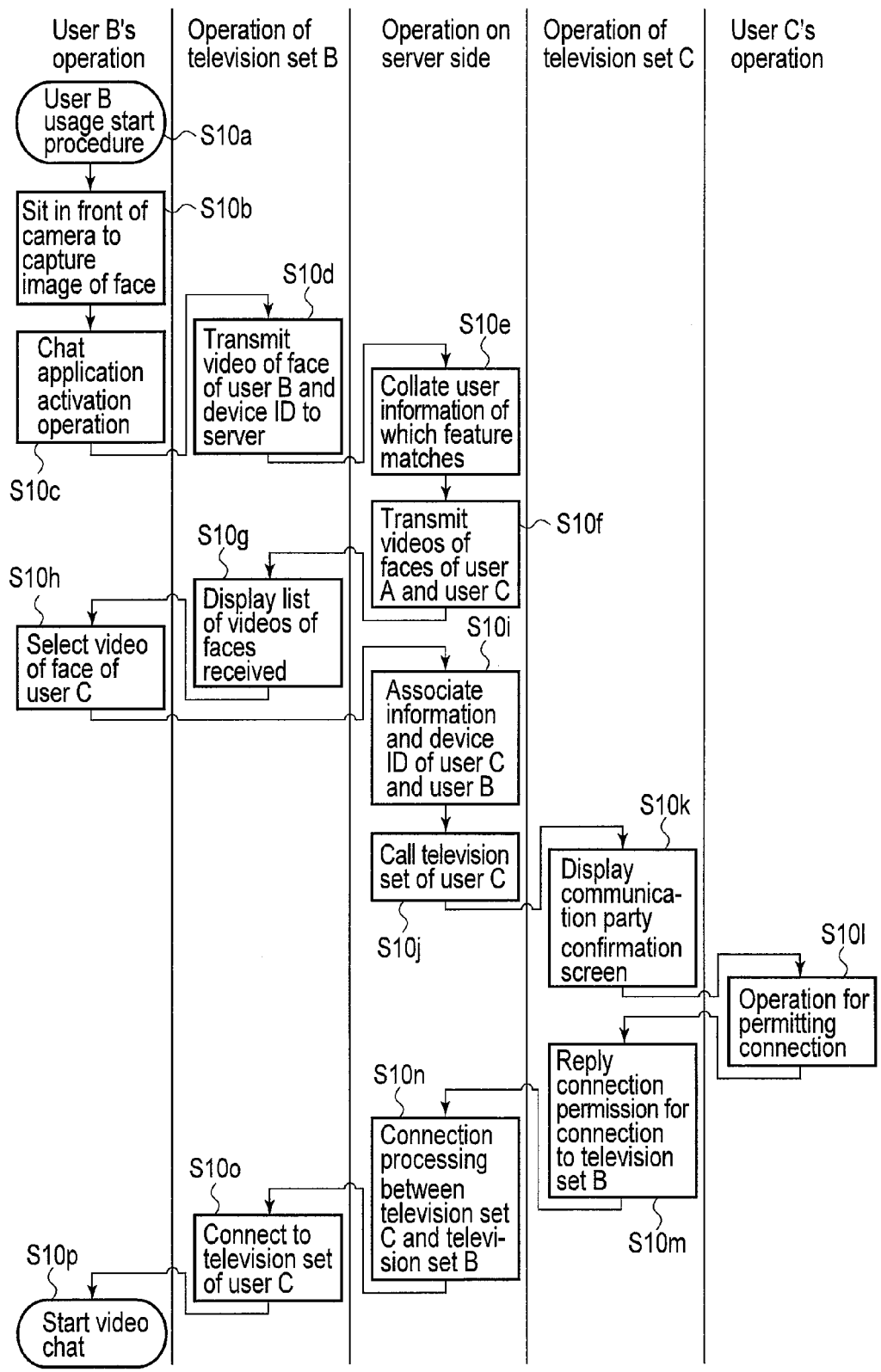
FIG. 10 is a flowchart for illustrating and explaining another example of registration operation performed by the other of the users with the digital television broadcast reception apparatus according to the embodiment.

FIG. 10 illustrates a flowchart summarizing an example of procedure according to which user B performs registration with respect to the video chat server 14, when the registration of user A and user B in tandem with respect to the video chat server 14 is completed and the registration of another user C and user B in tandem with respect to the video chat server 14 is completed.

More specifically, when started (step S10a), in step S10b, user B sits at a position where an image of the face of user B is captured by the image-capturing module of the digital television broadcast reception apparatus 12 possessed by user B, and operates the video chat activation key of the remote controller associated with the digital television broadcast reception apparatus 12 to access the video chat server 14 in step S10c.

Accordingly, the digital television broadcast reception apparatus 12 of user B transmits the device ID of himself/herself and the video of user B's face to the video chat server 14 in step S10d. Then, in step S10e, the video chat server 14 extracts a video of a face of which feature matches the received video of user B's face from among many pieces of user information registered, and in step S10f, the video chat server 14 replies the video of user C's face and the video of user A's face, which is registered in tandem with the video of the face extracted, to the digital television broadcast reception apparatus 12.

For this reason, in step S10g, the digital television broadcast reception apparatus 12 displays the video of user C's face and the video of user A's face received from the video chat server 14 on the video display module 23 as video. Then, suppose that, in step S10h, user B operates the remote controller associated with the digital television broadcast reception apparatus 12 to select and enter the video of user C's face.

Then, in step S10i, the video chat server 14 records the information about user C which has already been input (the primary registrant name, the device ID of the digital television broadcast reception apparatus, the video of user C's face, and the like) and the information about user B (the dependent registrant name, the device ID of the digital television broadcast reception apparatus 12, the video of user B's face, and the like) which are associated with each other, and on this occasion, the registration of user B with regard to user C with respect to the video chat server 14 is performed.

Then, in step S10h, when user B selects and enters the video of user A's face, the video chat server 14 records, in step S10i, the information about user A which has already been input (the primary registrant name, the device ID of the digital television broadcast reception apparatus 11, the video of user A's face, and the like) and the information about user B (the dependent registrant name, the device ID of the digital television broadcast reception apparatus 12, the video of user B's face, and the like) which are associated with each other, and on this occasion, the registration of user B with regard to user A with respect to the video chat server 14 is performed.

More specifically, even when two users, i.e., users A and C respectively perform registration in tandem, user B can complete the registration with regard to the selected users A and C with respect to the video chat server 14 just by performing simple operation of selecting user A or C and activation operation of the video chat. Accordingly, user B can complete the initial setting to the video chat server 14 without the need for any complicated registration operation, and therefore, this can improve the convenience and practicability for user B.

Thereafter, in step S10j, the video chat server 14 calls the digital television broadcast reception apparatus of user C, and connects to the digital television broadcast reception apparatus in such a manner as to be able to communicate therewith. Then, in step S10k, the digital television broadcast reception apparatus of user C displays the communication party confirmation screen 35, an example of which is shown in FIG. 8, on the video display module 23 as video.

When in step S10l user C permits connection in this communication party confirmation screen 35 by operating the remote controller associated with the digital television broadcast reception apparatus of user C, the digital television broadcast reception apparatus of user C replies connection permission for connection with the digital television broadcast reception apparatus 12 of user B to the video chat server 14 in step S10m.

Accordingly, in step S10n, the video chat server 14 connects the digital television broadcast reception apparatus of user C and the digital television broadcast reception apparatus 12 of user B so as to allow communication therebetween. In step S10o, the digital television broadcast reception apparatus 12 of user B is controlled to be able to communicate with the digital television broadcast reception apparatus of user C. Accordingly, user B can start video chat with user C (step S10p).

Figure 11:
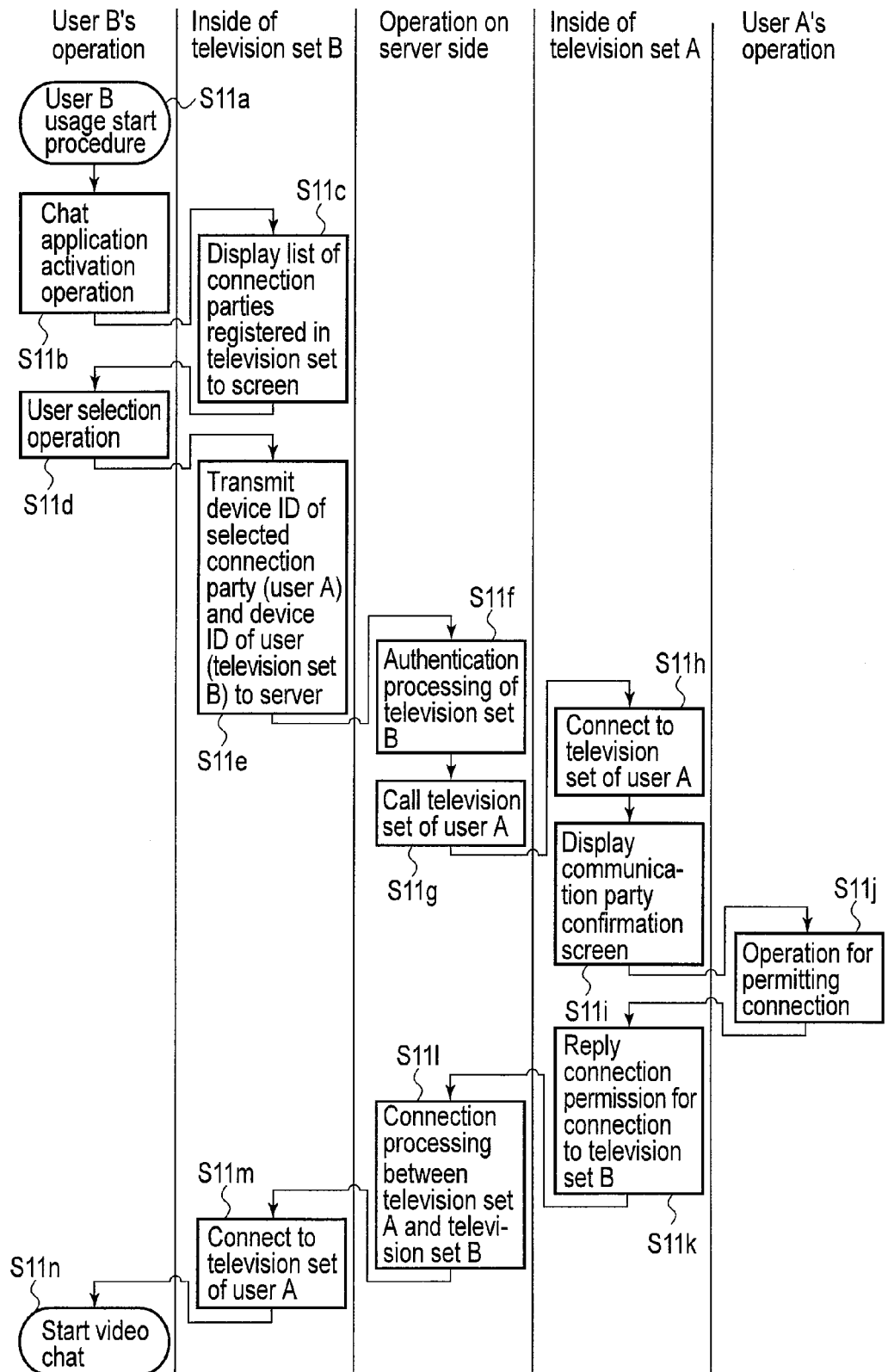
FIG. 11 is a flowchart for illustrating and explaining another example of video chat start operation performed by the other of the users with the digital television broadcast reception apparatus according to the embodiment.

FIG. 11 illustrates a flowchart summarizing an example of procedure according to which user B conducts video chat with one of users, i.e., user A, when the registration of user B with regard to users A and C is completed as described above. More specifically, when started (step S11a), in step S11b, user B operates the video chat activation key of the remote controller associated with the digital television broadcast reception apparatus 12 possessed by user B to access the video chat server 14.

Then, in step S11c, the digital television broadcast reception apparatus 12 displays the communication party confirmation screen 36, an example of which is shown in FIG. 12, on the video display module 23 as video. When user B performs the registration with respect to the video chat server 14 with regard to users A and C, the communication party confirmation screen 36 is generated based on information obtained by the digital television broadcast reception apparatus 12, and the communication party confirmation screen 36 shows the video of user A's face 36a, the video of user C's face 36b, and an inquiry message 36c "Who are you going to talk to?".

While the communication party confirmation screen 36 is displayed, user B operates the cursor-left or cursor-right key of the remote controller associated with the digital television broadcast reception apparatus 12 of user B, and user B selects the video of user A's face 36a and operates the enter key, in step S1id.

Then, in step S11e, the digital television broadcast reception apparatus 12 transmits, to the video chat server 14, the device ID of the digital television broadcast reception apparatus 11 possessed by user A, and the device ID of the digital television broadcast reception apparatus 12. Accordingly, in step S11f, the video chat server 14 executes authentication processing of the digital television broadcast reception apparatus 12 of user B.

Thereafter, in step S11g, the video chat server 14 calls the digital television broadcast reception apparatus 11 of user A, and in step S11h, connects to the digital television broadcast reception apparatus 11 in such a manner as to be able to communicate therewith. Then, in step S11i, the digital television broadcast reception apparatus 11 of user A displays the communication party confirmation screen 35, an example of which is shown in FIG. 8, on the video display module 23 as video.

When in step S11j user A permits connection in this communication party confirmation screen 35 by operating the remote controller 27 associated with the digital television broadcast reception apparatus 11, the digital television broadcast reception apparatus 11 of user A replies connection permission for connection with the digital television broadcast reception apparatus 12 of user B to the video chat server 14 in step S11k.

Accordingly, in step S11l, the video chat server 14 connects the digital television broadcast reception apparatus 11 of user A and the digital television broadcast reception apparatus 12 of user B so as to allow communication therebetween. In step S1im, the digital television broadcast reception apparatus 12 of user B is controlled to be able to communicate with the digital television broadcast reception apparatus 11 of user A. Accordingly, user B can start video chat with user A (step S11n).

In this case, in the above embodiment, the digital television broadcast reception apparatuses 11, 12 are shown as devices constituting the video chat system. However, devices using the video chat service are not limited thereto. For example, the video chat service can be used as long as it is a device capable of transmitting/receiving video and audio such as a personal computer (PC), an optical disk recording/reproduction apparatus, and a portable information terminal.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing apparatus for conducting videoconferencing via a network with a device of a second person, using a videoconferencing service provided by a server, the video processing apparatus comprising:
    an image-capturing module configured to capture a video of a face of a first person;
    a display controller configured to perform control so as to provide the server with the video of the face of the first person captured by the image-capturing module, and obtain, from the server, a video of a face of a second person with whom the videoconferencing is conducted, which is registered in tandem with the video of the face of the first person, and display the video of the face of the second person, the video of the face of the second person being generated at the server based on an image of the face of the second person captured by the image-capturing module and sent to the server; and
    an output module configured to input a confirmation result indicating whether the video of the face of the second person displayed based on the control of the display controller is a correct person with whom the videoconferencing is to be conducted.

2. The video processing apparatus of claim 1, further comprising a selection module configured to select a video of a face of a person with whom the videoconferencing is to be conducted, when there is a plurality of videos of faces displayed based on the control of the display controller.

3. A videoconferencing system for conducting videoconferencing via a network between a first device and a second device, using a videoconferencing service provided by a server,
    the first device comprising:

an input module configured to be able to perform input operation in order to register, to the server, information including a video of a face of a first user of the first device and information including a video of a face of a second user of the second device, in such a manner that the information including the video of the face of the first user of the first device and the information including the video of the face of the second user of the second device are registered in tandem, the video of the face of the second person being generated at the server based on an image of the face of the second person captured by the image-capturing module and sent to the server, the second device comprising:

a second image-capturing module configured to capture a video of a face of the second user, and a display controller configured to perform control so as to provide the server with the video of the face of the second user captured by the second image-capturing module, and obtain, from the server, a video of a face of the first user of the first device, which is registered in tandem with the video of the face of the second user, and display the video of the face of the second user of the second device, and an output module configured to input a confirmation result indicating whether the video of the face of the second user displayed based on the control of the display controller is a correct person with whom the videoconferencing is to be conducted.

4. The videoconferencing system of claim 3, wherein the first device includes:

a display controller configured to perform control so as to display the video of the face of the second user of the second device when a confirmation result indicating that the video of the face of the second user displayed based on the control of the display controller is a correct person with whom the videoconferencing is to be conducted is input into the input module of the second device; and a selection module configured to select whether the videoconferencing is to be conducted with the user of the video of the face displayed based on the control of the display controller.

5. A control method for a video processing apparatus for conducting videoconferencing via a network with a device of a second person, using a videoconferencing service provided by a server, the control method comprising:

capturing videos of a face of a first person and an image of a face of a second person;

providing the server with the videos of the face captured;

obtaining, from the server, a video of the face of the second person with whom the videoconferencing is conducted, which is registered in tandem with the video of the face of the first person, and displaying the video of the face of the second person, the video of the face of the second person being generated at the server based on the image of the face of the second person captured and sent to the server; and performing control so as to input a confirmation result indicating whether the video of the face displayed is a correct person with whom the videoconferencing is to be conducted.

\* \* \* \* \*